Nov. 1, 1966    G. D. JONES ET AL    3,282,159
COLOR REVERSIBLE ELECTROCHEMICAL LIGHT
FILTER UTILIZING ELECTROLYTIC SOLUTION
Filed Jan. 7, 1963
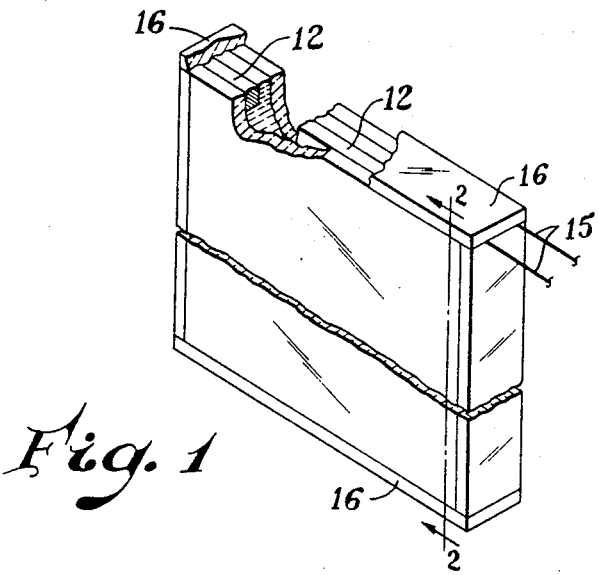
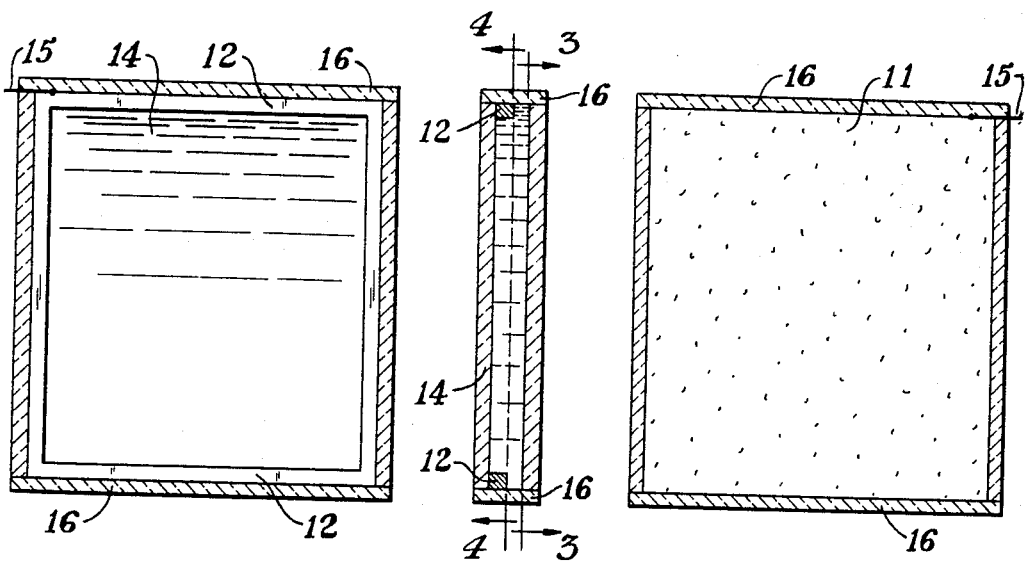
Fig. 4       Fig. 2       Fig. 3
INVENTORS.
Giffin D. Jones
Ralph E. Friedrich
BY    Griswold & Burdick
ATTORNEYS

United States Patent Office 3,282,159
Patented Nov. 1, 1966

3,282,159
COLOR REVERSIBLE ELECTROCHEMICAL LIGHT FILTER UTILIZING ELECTROLYTIC SOLUTION
Giffin D. Jones and Ralph E. Friedrich, Midland, Mich., assignors to The Dow Chemical Company, Midland, Mich., a corporation of Delaware
Filed Jan. 7, 1963, Ser. No. 249,861
3 Claims. (Cl. 88—107)

This invention relates to an improved electromechemical, substantially transparent, light filter the color of which may be reversibly altered upon the appropriate application of electric current.

Tinted or colored glass has found wide acceptance and applicability. It is useful in situations where direct sun or other light is harmful or undesirable. In such situations the tinted or colored glass may filter out a portion of the light or simply reduce its intensity. Usually, the incident light is undesirably intense only during certain periods of the day. In this situation, it is desirable that the glass be clear or nearly clear at least a part of the time. Eastern exposure windows, for example, would desirably be tinted in the morning and clear during the afternoon. For western exposure windows, of course, the reverse could be true.

Numerous attempts have been made to provide light filters of variable absorption. One such attempt is disclosed in U.S. Patent 2,710,274. That patent discloses a method wherein a substantially transparent sandwich of two outside layers of glass and a middle layer of a material whose transparency changes with luminous intensity and/or temperature. These filters have the apparent disadvantage of being dependent on luminous intensity and/or temperature and, to that extent, are not subject to positive control of light transmission.

Other proposed methods of providing a variable intensity light filter include (as suggested in U.S. Patent 2,953,819) the orientation of small particles contained in a liquid by means of an electric field, thereby altering the transmission of light through the liquid. A method is suggested in British Patent 328,017 wherein a clear solution is caused to develop a color as long as electric current is passed therethrough, the color disappearing and the solution clarifying immediately upon termination of the current. Similarly, in U.S. Patent 2,632,045, an electrochemical color filter is suggested in which the intensity of the color is proportional to the voltage applied thereto. As the potential is decreased, the solution in the filter reverts to its original (usually clear) state.

None of the above methods succeed in a color change which will remain as long as desired without the continuous application of current to the solution in the filter.

We have discovered an electrochemical light filter, the color of which may be reversibly altered and, once formed, will remain over a substantial period of time without further application of electric current thereto.

A better understanding of the present invention together with its attendant objects and advantages will be facilitated by the following specification when taken in conjunction with the accompanying drawings in which:

FIGURE 1 is an isometric view partially in section of one embodiment of the filter of the present invention.

FIGURE 2 is a sectioned plan view of the filter of the present invention.

FIGURE 3 is a sectional view of the filter of the present invention which illustrates in more detail the transparent gross electrode.

FIGURE 4 is a sectional view of the filter of the present invention which illustrates in more detail the minor electrode.

In the embodiment illustrated in the drawings, one major internal surface 11 of the filter is treated so as to make a major portion of that side electrically conductive without destroying transparency. A relatively small, inert conductive electrode surface 12 is provided within the filter. In the embodiment illustrated, the electrode surface 12 is in the form of a peripheral strip around the outer edge of major internal surface 14 of the filter. Other configurations are, of course, possible and may also be desirable. Each electrode is provided with means, such as wires 15, to connect an external source of direct current. Sealing means 16 is generally employed to protect the solution from contact with air and to prevent spillage in handling and use.

The filter may be constructed of glass, suitable plastics or any other substantially transparent material which is impervious to the aqueous solution to be retained within the body of the filter. Desirably the transparent material has characteristics which will permit its use as a structural member as, for example, in interior or exterior window glass fixtures.

Ordinarily, the transparent gross electrode will preferably cover the entire surface of one major internal surface of the filter. Suitable materials for forming this transparent electrode are stannic or indium oxide, a light metallized coating or a metallic screen of particles sufficiently small that substantial transparency is maintained. The minor, preferably inert, electrode need not be transparent. Silver, platinum, chromium, nickel, tungsten, calomel, or wires coated with these materials or the like may be used, deepnding on the solution to be contained in the article.

Appropriate aqueous, light transmitting solutions for use in the filter of the present invention are those containing complexed titanium ions. Other ions permissible in the aqueous solutions useful in the filter of the present invention are those which do not form precipitates with the complexed titanium ions or other ions present, and are not readily oxidized or reduced. Examples of other ions permissible in the aqueous solution are: sodium, lithium, potassium, ammonium, hydrogen, magnesium, acetate, chloride, sulfate, nitrate, acid phosphate, and the like which exhibit the requisite characteristics outlined above.

Suitable complexing materials, for use in the present invention, are those which render the titanium ion stable in aqueous solution in a $+3$ and $+4$ valence. Chloride ion is the preferred complexing agent. Diketones, such as acetyl acetone, 2,4-pentanone, 2,4-hexanone, and the like, may also be employed as appropriate complexing agents for titanium ion in accordance with the present invention.

Solutions in accordance with the present invention should contain an amount of titanium ion of from about 0.1 percent by weight of solution up to the solubility limit of titanium. An excess of complexing agent should be employed to insure that all the titanium ion is complexed. Thus when the chloride ion is used as the complexer at least a 20 percent excess is preferred and at least 100 percent excess desired.

Voltage applied between the electrodes should be sufficient to cause current flow, but should be below the gassing limit of the particular cell used. The electrode-electrolyte voltage should be below the accepted decomposition potential (about 2.2 volts). Total voltage applied to the electrodes will, of course, take into account the conductivity of the electrolyte solution and the cell geometry. For instance, if the voltage drop across the electrolyte in the particular cell to be used were one volt, and three volts were applied between electrodes, the electrode-electrolyte voltage would be two volts and thus below the 2.2 volt gassing limit.

In some instances it may be desirable to mix into the solution a freezing point depressant. Further, in some applications the addition of a gelling agent may be desirable, mainly to prevent leakage. None of these are essential. The use of these additives such as an anti-freeze or a gelling agent, should be considered in light of the particular metal-containing ions contained in the solution. Some alcohols may react with the ion in solution and would thus be undesirable. Tertiary alcohols, however, and particularly tertiary-butyl alcohol, as well as the known inorganic freezing point depressants are generally useful as anti-freeze additives in the present invention.

A wide variety of gelling agents such as polyvinyl trimethylammonium chloride, hydrolyzed polyisopropenyl-acetate, or the like may also be employed, if desired.

Maximum color stability may be obtained by protecting the solution from contact with air. When the solution is so-protected, color formed by the passage of current through the solution will usually remain for at least several hours or until a current is passed through the solution in the reverse direction.

The present invention may be more readily understood in light of the following example which is set forth to illustrate, and is not to be construed to limit, this invention.

*Example*

A glass cell was constructed substantially as hereinbefore described having a one inch square transparent gross electrode of glass coated with tin oxide and a minor electrode of silver.

A solution was prepared by dissolving about five grams of titanium tetrachloride ($TiCl_4$) in seventy milliliters (83 grams) of concentrated hydrochloric acid and used to fill the above cell which was then sealed. With the conducting glass electrode cathodic, a current of about 2 milliamperes was passed through the solution which turned violet-purple. After several hours of standing with no current flow through the solution, no observable color change had taken place. Upon reversal of the current flow, the solution reverted to its initial pale yellow color.

Diketones such as acetyl acetone, 2,4-pentanone, or 2,4-hexanone may be substituted for the hydrochloric acid in the above example as complexing agents with substantially similar results.

Various modifications may be made in the present invention and it is to be understood that we limit ourselves only as defined in the appended claims.

We claim.

1. In an electrochemical light filter having a transparent gross electrode, a minor electrode in spaced relationship to the gross electrode and which is spaced and positioned to allow the passage of light, a light transmitting electrolyte occupying the space between said electrodes, an electrical power source and means for reversibly applying such electrical power to the electrodes, the improvement which comprises providing as said electrolyte an aqueous solution containing a coloring amount of a complexed titanium ion stable in aqueous solution in the $+3$ and $+4$ valence states whereby the color of the aqueous solution is altered by sequentially applying pulses of electrical power of opposite polarity.

2. The electrochemical light filter of claim 1 wherein the amount of complexed titanium ion is from about 0.1 percent by weight of solution up to the solubility limit of the titanium ion in the aqueous solution.

3. The electrochemical light filter of claim 1 wherein the complexing agent is chloride ion.

References Cited by the Examiner

UNITED STATES PATENTS

| | | |
|---|---|---|
| 2,632,045 | 3/1953 | Sziklai _____ 88—107 X |
| 2,710,274 | 6/1955 | Kuehl. |
| 2,953,819 | 9/1960 | Holoubek et al. ____ 106—291 X |

FOREIGN PATENTS

| | | |
|---|---|---|
| 328,017 | 4/1930 | Great Britain. |

DAVID H. RUBIN, *Primary Examiner.*

J. G. BOLTEN, *Assistant Examiner.*